United States Patent
Stephenne et al.

(10) Patent No.: US 9,811,915 B2
(45) Date of Patent: Nov. 7, 2017

(54) INTEGRATION OF IMAGE/VIDEO PATTERN RECOGNITION IN TRAFFIC ENGINEERING

(71) Applicant: Huawei Technologies Co., Ltd., Shenzhen (CN)

(72) Inventors: Alex Stephenne, Stittsville (CA); Aaron Callard, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 14/834,075

(22) Filed: Aug. 24, 2015

(65) Prior Publication Data

US 2017/0064531 A1 Mar. 2, 2017

(51) Int. Cl.
| | |
|---|---|
| *H04W 4/00* | (2009.01) |
| *G06T 7/20* | (2017.01) |
| *G06K 9/00* | (2006.01) |
| *H04W 40/20* | (2009.01) |
| *H04W 40/06* | (2009.01) |
| *H04W 48/20* | (2009.01) |

(52) U.S. Cl.
CPC ............ *G06T 7/20* (2013.01); *G06K 9/00785* (2013.01); *H04W 40/20* (2013.01); *G06T 2207/30236* (2013.01); *H04W 40/06* (2013.01); *H04W 48/20* (2013.01); *Y02B 60/50* (2013.01)

(58) Field of Classification Search
CPC ..... H04W 12/06; H04W 12/08; H04W 88/02; H04B 1/3816; H04L 63/105; G06Q 20/322
USPC ...................................................... 455/422.1
See application file for complete search history.

(56) References Cited

U.S. PATENT DOCUMENTS

| | | | |
|---|---|---|---|
| 9,197,452 B2 | 11/2015 | Menzel et al. | |
| 2008/0247345 A1* | 10/2008 | Bahar ................... | H04W 76/02 370/310 |
| 2008/0284669 A1* | 11/2008 | Hunton ..................... | H01Q 1/22 343/757 |
| 2011/0269481 A1 | 11/2011 | Halfmann et al. | |
| 2013/0328723 A1* | 12/2013 | Rappaport ........... | H04B 1/3838 342/372 |

(Continued)

FOREIGN PATENT DOCUMENTS

| | | |
|---|---|---|
| CN | 101808327 A | 8/2010 |
| CN | 101917756 A | 12/2010 |

(Continued)

*Primary Examiner* — William Nealon
(74) *Attorney, Agent, or Firm* — Slater Matsil, LLP

(57) ABSTRACT

Visual information from camera sensors can be used to assign scheduling and/or transmission parameters in a wireless network. For example, the visual information can be used to visually discover a user equipment (UE) prior to initiating link discovery. This may be accomplished by analyzing the visual information to identify an absolute or relative position of the UE. The positioned may then be used to select antenna configuration parameters for transmitting a discovery signal, e.g., direction of departure (DoD), angle of departure (AoD), precoder. As another example, the visual information is used to predict a link obstruction over a radio interface between a UE and an AP. In yet other examples, the visual information may be used for traffic engineering purposes, such as to predict a traffic density or pair UEs with APs.

31 Claims, 7 Drawing Sheets

(56) References Cited

U.S. PATENT DOCUMENTS

2014/0105046 A1\* 4/2014 Tellado ................ H04W 24/08
                                                            370/252
2014/0208387 A1\* 7/2014 Ganesh ................ H04W 12/04
                                                            726/4
2015/0201443 A1\* 7/2015 Emani

FOREIGN PATENT DOCUMENTS

| CN | 103281711 A | 9/2013 |
|----|-------------|---------|
| CN | 103477597   | 12/2013 |
| CN | 104242996 A | 12/2014 |

\* cited by examiner

INTEGRATION OF IMAGE/VIDEO PATTERN RECOGNITION IN TRAFFIC ENGINEERING

TECHNICAL FIELD

The present invention relates generally to telecommunications, and in particular embodiments, to techniques and mechanisms for the integration of image/video pattern recognition in traffic engineering.

BACKGROUND

Next-generation wireless networks may need to provide quick link discovery and improved link-adaptation to satisfy increasing quality of experience (QoE) expectations of mobile users. Moreover, next-generation wireless networks may implement wireless physical layer characteristics that cause the access link to be more sensitive to interference caused by link obstructions and/or environmental conditions, and that increase the complexity of link discovery. For example, next-generation wireless networks may include high-frequency access points (APs) that communicate millimeter wave (mmW) radio signals. Such high-frequency signals may require high degrees of spatial selectivity to achieve suitable signal range, which may render them more susceptible to link obstructions. Moreover, the reliance on highly directional beamforming complicates initial cell search since the user equipment (UE) and the high-frequency access point must jointly search over a potentially large angular directional space to locate suitable antenna configuration parameters for establishing the high-frequency interface. Accordingly, techniques for achieving fast link discovery and improved link-adaptation are desired for next-generation wireless networks.

SUMMARY OF THE INVENTION

Technical advantages are generally achieved, by embodiments of this disclosure which describe location-based beam alignment speed up strategies for directional wireless networks.

In accordance with an embodiment, a method for camera aided wireless network management is provided. In this example, the method includes receiving visual information from one or more camera sensors monitoring coverage areas of a wireless network, and assigning a scheduling or transmission parameter for a transmission between a transmit point and a receive point in accordance with the visual information provided by the one or more camera sensors. An apparatus for performing this method is also provided.

In accordance with another embodiment, another method for camera aided wireless network management is provided. In this example, the method includes receiving visual information from one or more camera sensors monitoring coverage areas of a wireless network, and predicting traffic density or pairing user equipments (UEs) with access points (APs) using the visual information provided by the one or more camera sensors.

In accordance with yet another embodiment, a method for camera aided management of backhaul links is provided. In this example, the method includes receiving visual information from one or more camera sensors monitoring a microwave backhaul link between a first network-side component and a second network-side component, identifying a movement of the second network component using the visual information, and modifying a transmission angle of a signal communicated over the microwave backhaul link to compensate for the movement of the second network component.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
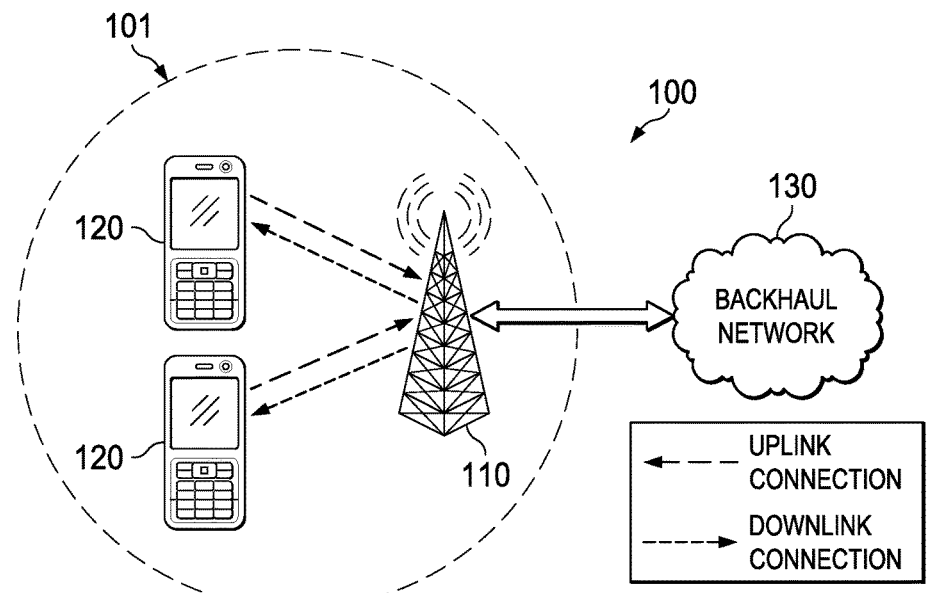
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure use visual information from camera sensors to assign scheduling and/or transmission parameters in a wireless network. In some embodiments, the visual information is used to visually discover a user equipment (UE) prior to initiating link discovery. For example, the visual information may be analyzed to identify an absolute or relative position of the UE in a coverage area of an access point (AP), which can be used to select antenna configuration parameters for transmitting a discovery signal, e.g., direction of departure (DoD), angle of departure (AoD), precoder. In other embodiments, the visual information is used to predict a link obstruction over a radio interface between a UE and an AP. In one example, the visual information is used to track a position of the UE migrating in or near a coverage area of the AP. The visual information may then be used to predict that the served UE will migrate to a position such that an object (e.g., a building) will interrupt the signal path between the UE and the AP. In another example, the visual information is used to identify a weather condition (e.g., precipitation), and to predict that the weather condition will increase a path loss over the radio interface. Predicting the link obstruction may allow a transmission or scheduling parameter to be modified ahead of time to mitigate or avoid a reduction in link quality resulting from the link obstruction. For example, the transmit power level of a wireless transmission communicated between the AP and the UE may be increased to compensate for increased path loss resulting from the link obstruction. As another example, a modulation and coding scheme (MCS) level of a wireless transmission communicated between the serving AP and the served UE may be lowered to compensate for increased path loss resulting from the link obstruction. The lowered MCS level may allow the receiver (the UE or the AP) to accurately decode the transmission despite a reduction in received signal power resulting from the link obstruction. As yet another example, a new precoder may be assigned to the UE and/or AP to alter a signal path of a radio interface between the UE and the AP in order to partially or completely avoid the link obstruction. As yet another example, the UE may be handed off to a neighboring AP to partially or completely avoid the link obstruction. As yet another embodiment, a neighboring AP and the AP may be scheduled to jointly transmit data to, or jointly received data from, the UE. In other embodiments, the connections might be between two APs, or between an AP and another element of the network infrastructure as would be used in wireless backhaul connections on the case of relays. Those skilled in the art will appreciate that reference to a UE should also be interpreted as covering other terminal devices such as machine to machine devices that may not have a human user.

Aspects of this disclosure also use visual information for traffic engineering purposes. Specifically, camera sensors may monitor coverage areas of a wireless network, and provide visual information to a controller. The controller may then use the visual information to predict a traffic density or pair UEs with APs. These and other aspects are discussed in greater detail below.

While much of this disclosure describes inventive aspects in the context of transmission between access points (APs) and user equipments (UEs), it should be appreciated that those inventive concepts are applicable to any wireless transmission between a transmit point and a receive point. For example, visual information could be used to perform link adaptation between wireless backhaul links, machine-to-machine (M2M) links, and/or device-to-device (D2D) links.

FIG. 1 illustrates a network 100 for communicating data. The network 100 comprises an AP 110 having a coverage area 101, a plurality of mobile devices 120, and a backhaul network 130. As shown, the base station 110 establishes uplink and/or downlink connections with the mobile devices 120, which serve to carry data from the mobile devices 120 to the AP 110 and vice-versa. Data carried over the uplink/downlink connections may include data communicated between the mobile devices 120, as well as data communicated to/from a remote-end (not shown) by way of the backhaul network 130. As used herein, the term "access point (AP)" refers to any component (or collection of components) configured to provide wireless access to a network, for example a base station such as an evolved Node B (eNB) as defined by the 3rd Generation Partnership Project (3GPP), a macro-cell, a femtocell, a Wi-Fi access point (Wi-Fi AP), or other wirelessly enabled devices. Base stations provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station, such as a user equipment (UE), a mobile station (STA), and other wirelessly enabled devices that may or may not be mobile. In some embodiments, the network 100 includes various other wireless devices, such as relays, low power nodes.

Figure 2:
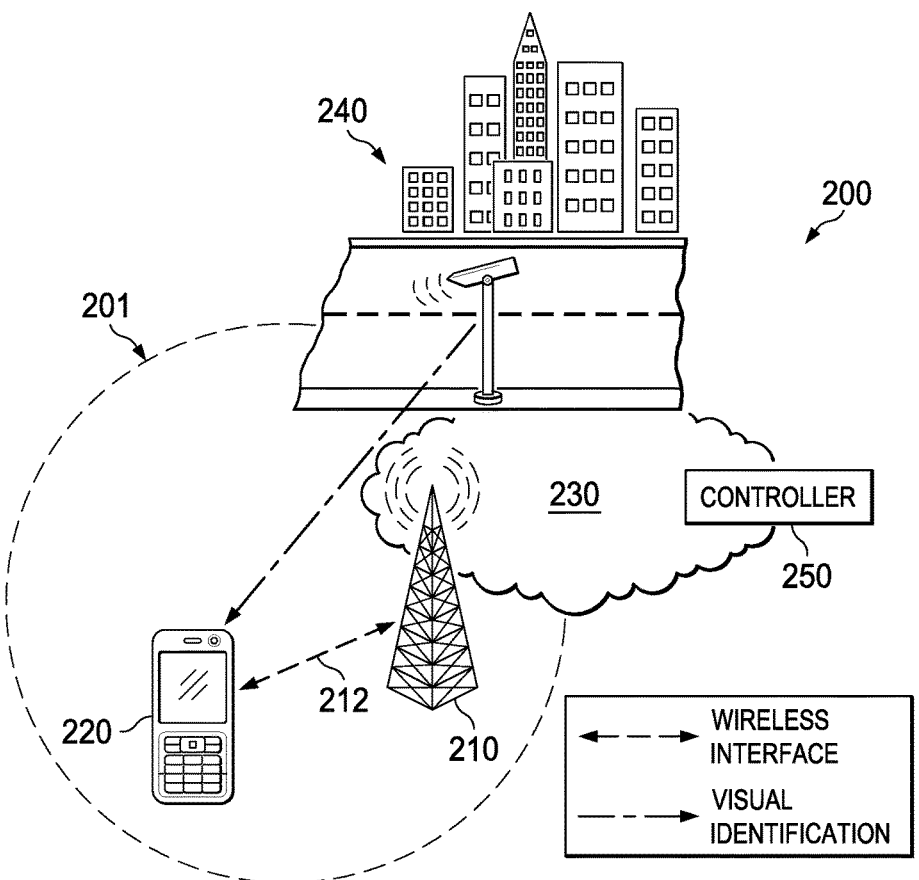
FIG. 2 illustrates a diagram of an embodiment wireless network in which visual information is used to assign scheduling or transmission parameters.

Aspects of this disclosure use visual information to assign scheduling or transmission parameters in wireless networks. FIG. 2 illustrates an embodiment wireless network 200 for using visual information to assign scheduling or transmission parameters. As shown, the embodiment wireless network 200 includes an access point (AP) 210, a controller 250, and a camera sensor 240. The camera sensor 240 may be any component that monitors a coverage area 201 of the AP 210, and provides visual information to the AP 210 and/or a controller 250. The visual information may be provided via a backhaul network 230, or through some other means, e.g., an internal connection. In some embodiments, the camera sensor 240 is co-located with the AP 210. In other embodiments, the camera sensor 240 is co-located with the controller 250. In yet other embodiments the camera sensor 240 is separate from both the AP 210 and the controller 250. While only a single camera sensor 240 is depicted in FIG. 2, it should be appreciated that multiple camera sensors may be strategically positioned to monitor different regions/angles of the coverage area 201.

Visual information provided by the camera sensor 240 to the AP 210 and/or the controller 250 may be used to assign a scheduling or transmission parameter in the wireless network 200. In some embodiments, the visual information relates to a specific user equipment (UE), such as the user equipment (UE) 220. In such embodiments, the UE 220 may be visually discovered by the camera sensor 240, or by the AP 210 and/or controller using the visual information provided by the camera sensor 240.

Various techniques may be used to visually discover the UE 220. For example, the UE 220 may be discovered by identifying a visual signature emitted by the UE 220, e.g., a light emitting diode (LED) signature. In some embodiments, the visual signature is emitted at a frequency that is outside the visible spectrum observed by humans, such as at a frequency below 430 terahertz (THz) or at a frequency above 790 terahertz (THz). The visual signature may be a universal signature emitted by a group of UEs (e.g., next-generation UEs). For instance, next-generation UEs may emit a common visual signature when they are seeking to be visually discovered, e.g., seeking to engage in link discovery. Alternatively, the visual signature may be assigned specifically to the UE 220, or to a group of UEs to which the UE 220 belongs, and may be used to identify one or more characteristics of the UE 220, e.g., subscriber ID, UE capabilities.

Various image processing steps may be performed to visually discover the UE 220. While the image processing steps may be performed entirely by the camera sensor 240, it should be appreciated that the some or all of the image processing steps for visually discovering the UE 220 may be performed by the AP 210 and/or the controller 250. In some embodiments, the camera sensor 240 directly discovers the UE 220 by locally processing a video signal of the coverage area to detect a visual signature of the UE 220. In such embodiments, the camera sensor 240 may perform a portion of the video processing prior to providing the visual information to the AP 210 and/or controller 250. For example, the visual information provided to the AP 210 and/or controller 250 may be a processed video feed accompanied by metadata (e.g., the UE 220 is depicted in a specific frame or time interval of the video feed) or a summary of the processed video feed (e.g., the UE 220 is located at a specific position in the coverage area 201). In other embodiments, the camera sensor 240 provides a raw video feed to the AP 210 or the controller 250, where the raw video feed is analyzed to discover/identify the UE 220. The term "raw video feed" refers to video data (compressed or otherwise) that has not been analyzed by the camera sensor 240 for purposes of visually identifying the UE 220.

Visual information pertaining to the UE 220 may be used for assigning or modifying a transmission or scheduling parameter. For example, the visual information may be processed to identify a relative or absolute position of the UE 220 in or near the coverage area 201. The relative or absolute position of the UE 220 may then be used to predict an angles of departure (AoD) or a direction of departure (DoD) for a signal path between the UE. The predicted AoD or DoD can then be used to assign a precoder to a discovery signal transmission between the UE 220 and the AP 210. As another example, the visual information may be used to predict a device orientation of the UE 220 or a mechanical beamsteering orientation of the UE 220, which may be used to assign a scheduling or transmission parameter to the UE 220 or the AP 210. As yet another example, the visual information may be used to track a position of the UE 220 or a moving object, and to predict a link obstruction or a handover condition.

In some embodiments, the visual information relates to an object or group of objects/devices, rather than a specific UE. For example, the visual information could relate to an object (e.g., a bus, a bird) or a weather condition (e.g., precipitation) that may present a link obstruction over the wireless interface 212. As another example, the visual information could be used to predicting traffic density. For example, the visual information could indicate that a group of UEs are migrating toward the coverage area 201, as may occur when a major road begins to become congested or patrons are entering/leaving a fairground or arena. As another example, the visual information could be used to pair UEs with APs.

Figure 3:
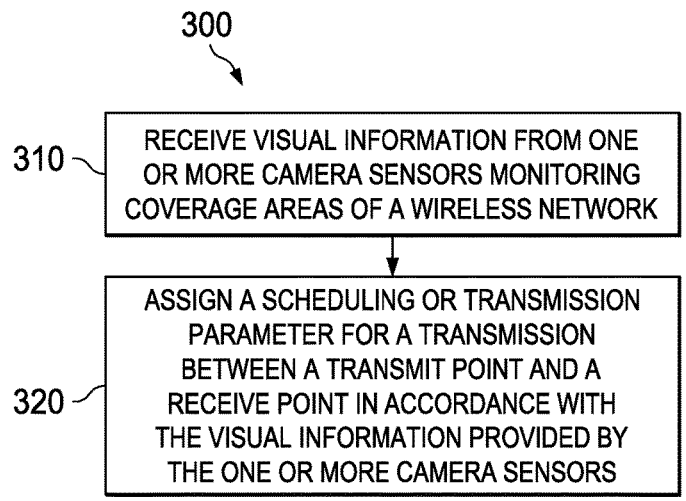
FIG. 3 illustrates a flowchart of an embodiment method for using visual information to assign transmission or scheduling parameters in a wireless network.

FIG. 3 illustrates a flowchart of an embodiment method 300 for using visual information to assign transmission or scheduling parameters in a wireless network, as might be performed by a network device, e.g., an access point, a controller. At step 310, the network device receives visual information from one or more camera sensors monitoring coverage areas of a wireless network. At step 320, the network device assigns a scheduling or transmission parameter for a transmission between a transmit point and a receive point in accordance with the visual information provided by the one or more camera sensors. In one embodiment, the network device uses the visual information to facilitate link discovery between the AP and the UE. For instance, the network device may predict a direction of departure (DoD) or an angle of departure (AoD) between the AP and the UE in accordance with the visual information, and assign a precoder to a discovery signal transmission between the AP and the UE in accordance with the predicted DoD or the predicted AoD. In another embodiment, the network device uses the visual information to predict a link obstruction between the UE and the AP, and then modifies a scheduling or transmission parameter to mitigate, or avoid, a reduction in link quality resulting from the link obstruction. The network device may use the visual information for other purposes as well.

Figure 4:
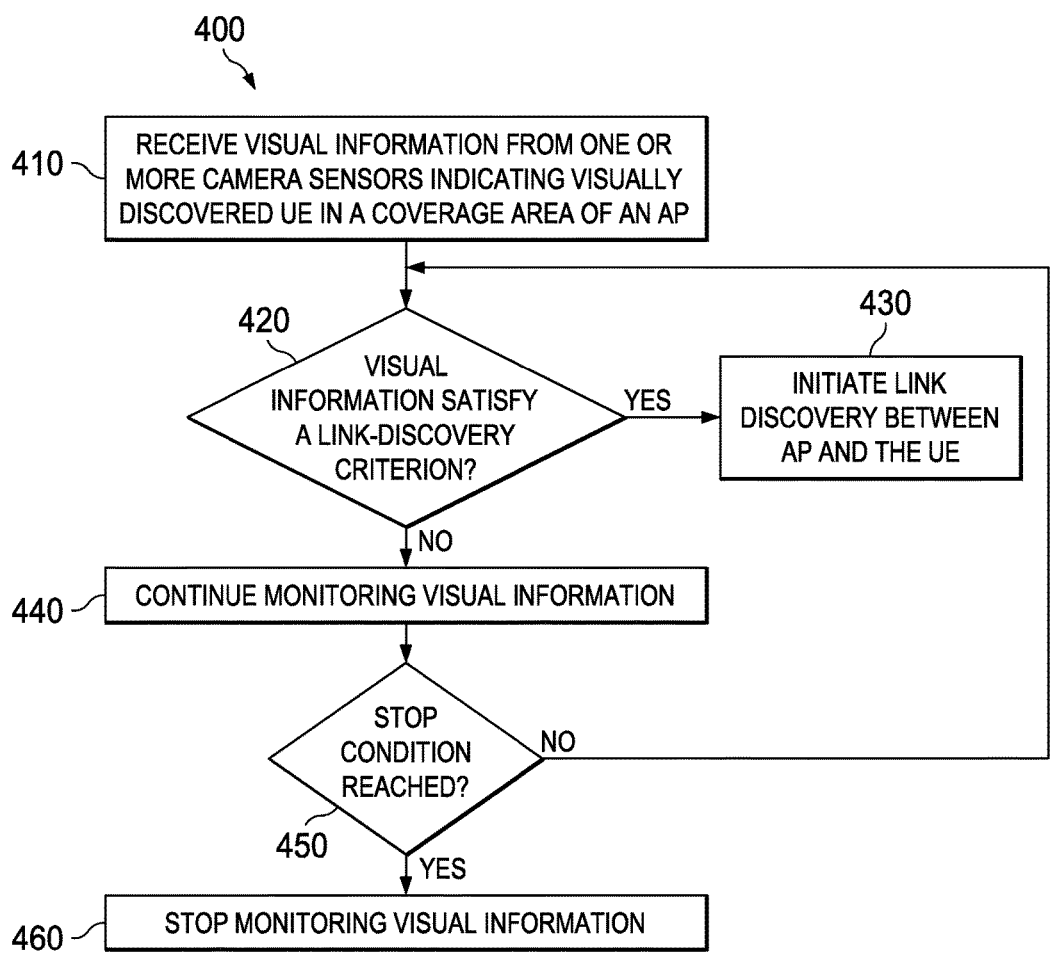
FIG. 4 illustrates a flowchart of an embodiment method for using visual information to achieve link discovery in a wireless network.

Visual information can be used to initiate and/or facilitate link discovery in wireless networks. FIG. 4 illustrates an embodiment method 400 for using visual information to achieve link discovery, as might be performed by a network device, e.g., an access point, a controller. At step 410, the network device receives visual information from one or more camera sensors. The visual information indicates that a UE has been visually discovered in a coverage area of an AP. At step 420, the network device determines whether the visual information satisfies a link-discovery criterion. The link-discovery criterion may correspond to a characteristic of a potential radio interface between the UE and the AP. For example, the link-discovery criterion may be satisfied when the visual information indicates an unobstructed line-of-sight between the AP and the UE. As another example, the link-discovery criterion may be satisfied when a predicted link quality between the AP and the UE, as estimated from the visual information, exceeds a threshold. The predicted link quality could correspond to a direct signal path (e.g., line-of-sight) or an indirect signal path the reflects off a reflection point (e.g., a building, a body of water, a street) between the transmit point and the receive point.

If the visual information satisfies a link-discovery criterion, the method 400 proceeds to step 430, where the network devices initiates link discovery between the AP and the UE. Otherwise, if the visual information does not satisfy the link-discovery criterion, then the method 400 proceeds to step 440, where the network device continues to monitor the visual information until either a stop condition is reached at step 450, or the visual information is deemed to satisfy the link-discovery criterion at step 420. If the stop condition is reached at step 450, then the method 400 proceeds to step 460, where the network device stops monitoring the visual information.

Figure 5A:
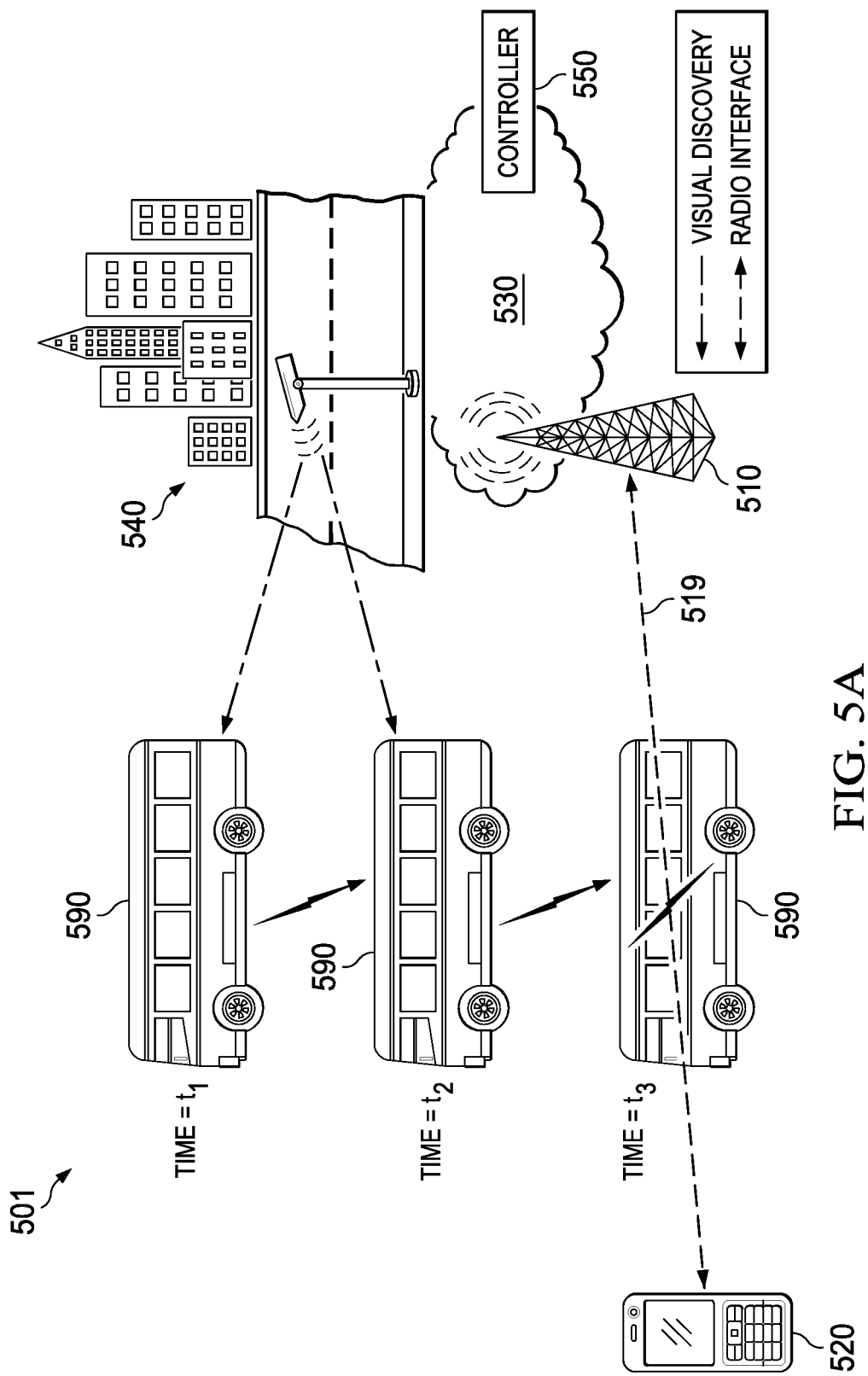
FIGS. 5A-5B illustrate diagrams of embodiment wireless networks in which visual information is used to predict link obstructions.
Figure 5B:
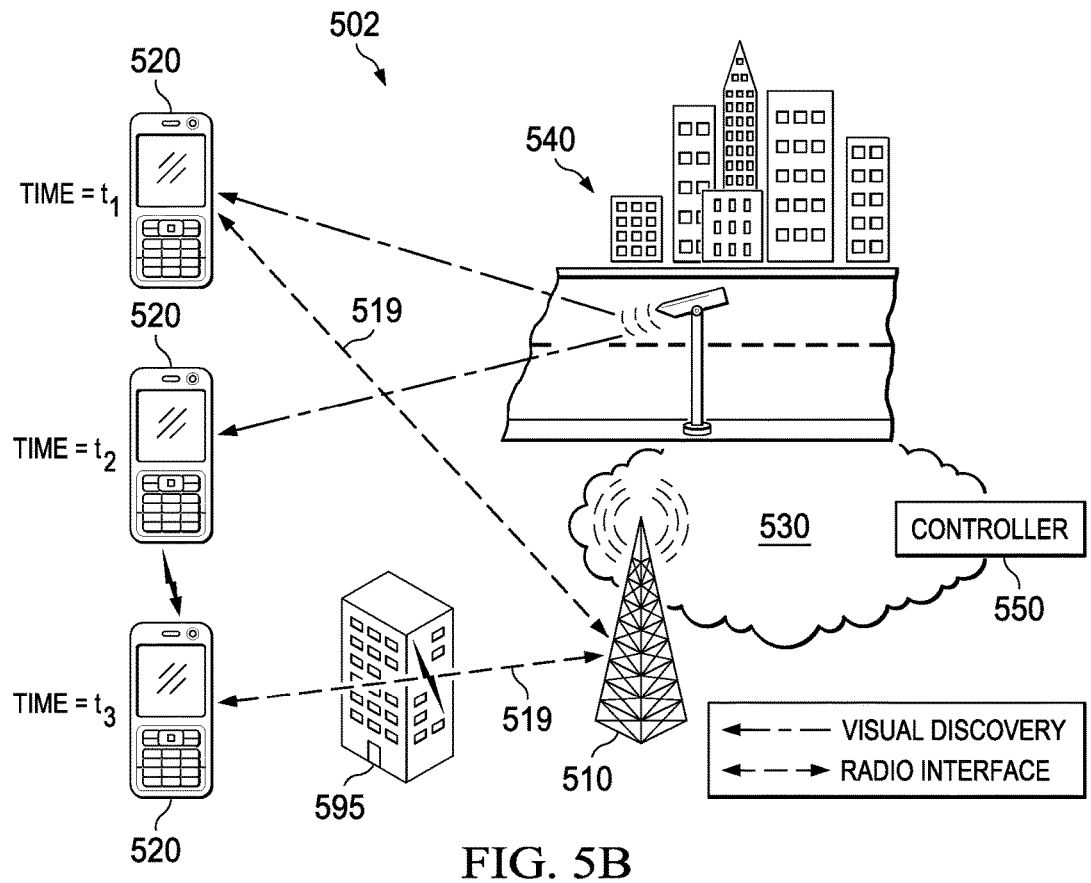

Visual information may also be used to predict a link obstruction. FIGS. 5A-5B illustrate embodiment wireless networks 501, 502 in which visual information is used to predict link obstructions. In the wireless network 501, visual information provided by a camera sensor 540 is used to track a spatial location of a moving object 590 migrating in a coverage area of an AP 510 between at least a first time period (t1) and a second time period (t2). The visual information is then used to predict that the moving object 590 will cause a link obstruction at a third time period (t3). In the wireless network 502, visual information provided by a camera sensor 540 is used to track a spatial location of the UE 520 migrating in a coverage area of the AP 510 between at least a first time period (t1) and a second time period (t2). The visual information is then used to predict that an object 595 will cause a link obstruction at a third time period (t3) prior to the third time period. It should be appreciated that visual information may also be used to track a moving object and a migrating UE, and to predict link obstruction when the moving object passes through a signal path of the migrating UE and an AP.

After predicting of the link obstruction, the AP 510 or a controller 550 may modify a transmission or scheduling parameter of the UE 520 and/or AP 510 for the third time period (t3) to mitigate or avoid a reduction in link quality resulting from the link obstruction. In some embodiments, the AP 510 or the controller 550 increases a transmit power level and/or reduce a modulation and coding scheme (MCS) level of a transmission communicated by the UE 520 or the AP 510 during the third time period (t3) to compensate for increased path loss resulting from the link obstruction. In other embodiments, the AP 510 or the controller 550 may modify an antenna transmission scheme of a transmission communicated over the radio interface 519 during the third time period (t3) to avoid, or mitigate effects from, the link obstruction. For instance, the AP 510 or the controller 550 may assign a new precoder to the UE 520 and/or the AP 510 such that a signal path of the radio interface 519 is altered to avoid, or mitigate effects from, the link obstruction. In one example, the signal path of the radio interface 519 is altered from a direct line-of-sight path to an indirect path (or vice versa) to avoid, or mitigate effects from, the link obstruction. In another example, the signal path of the radio interface 519 is altered from one indirect path to another indirect path to avoid, or mitigate effects from, the link obstruction. In yet another embodiment, the UE 520 is handed off to a neighboring AP. In yet another embodiment, data communicated to/from the UE 520 is scheduled to be jointly transmitted/received by the AP 510 and a neighboring AP.

Figure 6:
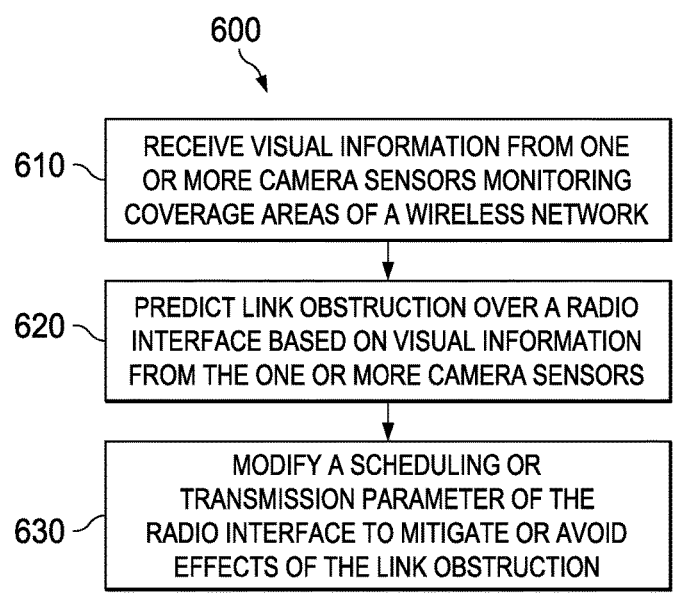
FIG. 6 illustrates a flowchart of an embodiment method for using visual information to predict a link obstruction in a wireless network.

FIG. 6 illustrates a flowchart of an embodiment method 600 for using visual information to predict a link obstruction in a wireless network, as might be performed by a network device, e.g., an access point, a controller. At step 610, the network device receives visual information from one or more camera sensors monitoring coverage areas of a wireless network. At step 620, the network device predicts a link obstruction over a radio interface based on the visual information. In one embodiment, the visual information is used to track an absolute or relative location of a UE migrating throughout one or more coverage areas. In such an embodiment, the network device may use the visual information to predict that the UE will migrate to a position such that an object (e.g., stationary structure, moving object) will pass through a signal path (e.g., line of sight, indirect path) between the UE and a serving AP. In another embodiment, the visual information is used to track an absolute or relative location of a moving object, and the network device uses the visual information to predict that the moving object will pass through a signal path between the UE and the AP. In yet another embodiment, the visual information indicates a weather condition (e.g., precipitation), and the network device uses visual information to predict that the weather condition will increase a path loss over a radio interface extending between the UE and the AP. Other scenarios are also possible.

At step 630, the network device modifies a scheduling or transmission parameter to mitigate or avoid effects from the link obstruction. If the link obstruction is an object that passes through a signal path of the radio interface, then the network device may modify a transmission or scheduling parameter to either compensate for increased path loss caused by the link obstruction or to avoid the link obstruction entirely. For example, the network device may increase a transmit power level and/or reduce a modulation coding scheme (MCS) of a transmission communicated during the period to compensate for the increased path loss caused by the link obstruction. As another example, the network device may modify an antenna transmission scheme of a transmission communicated to/from the UE during the period. For instance, the network device may assign a new precoder to the AP and/or the UE to alter a signal path of the radio interface. As yet another example, the network device may schedule a neighboring AP to transmit/receive a data transmission to/from the UE during the time period. This may entail initiating a handover of the UE from the serving AP to the neighboring AP, or scheduling a joint transmission or a joint reception between the serving AP and the neighboring AP. If the link obstruction is a weather condition (e.g., precipitation), then the network device may modify an antenna configuration of the AP and/or the UE. For instance, the network device may change from a multi-polarization scheme to a single polarization scheme to reduce the degree of signal attenuation that results from precipitation.

Figure 7:
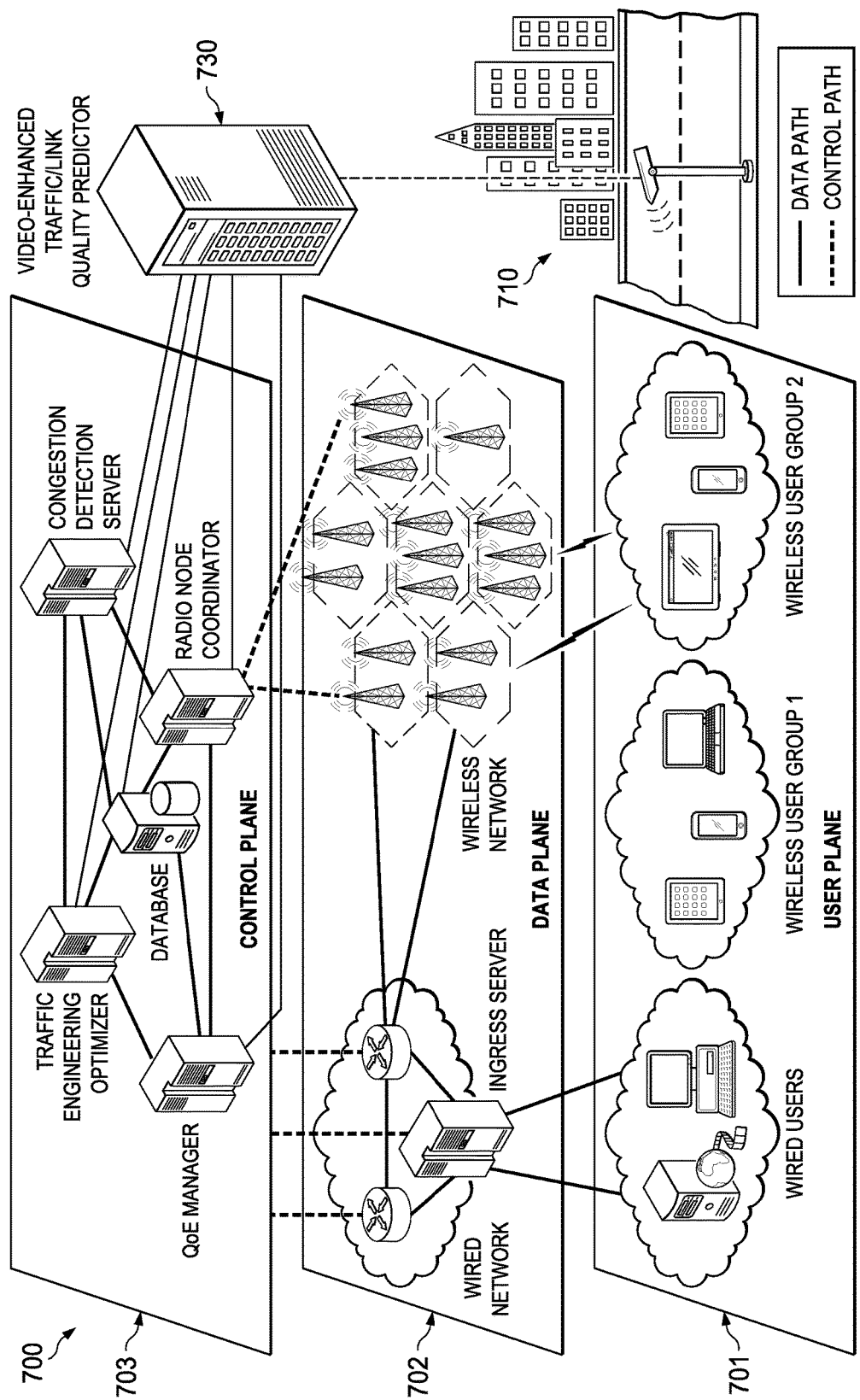
FIG. 7 illustrates a diagram of an embodiment network architecture in which visual information is used to make traffic engineering decisions.

Visual information may also be used to make traffic engineering decisions. FIG. 7 illustrates an embodiment network architecture 700 for using visual information to make traffic engineering decisions. As shown, the embodiment network architecture 700 includes a user-plane 701, a data plane 702, and a control plane 703. The user plane 701 corresponds to user-side devices, such as UEs, computers, and other devices capable of accessing the data plane 702. In this example, the user plane 701 includes a group of wired users and two groups of wireless users. The data plane 702 corresponds to network-side devices that provide, or facilitate, network access to user-side devices. In the context of LTE networks, the data plane 702 may include access points (APs) in the radio access network (RAN), in addition to network-devices (e.g., gateways) in the evolved packet core (EPC). The control plane 703 corresponds to network-side devices that control the manner in which user-side devices access the data plane 702. The control plane 703 may include network controllers (e.g., schedulers), which may include one or more of a radio node coordinator (RNC), a quality of experience (QoE) manager, a traffic engineering optimizer, and a congestion detection server. Control plane information may be stored in a database. In this example, the control plane 703 further includes a video-enhanced traffic/link quality predictor 730, which may receive and process visual information provided by camera sensors 710 monitoring the user-plane 701. In one embodiment, the video-enhanced traffic/link quality predictor 730 predicts a traffic density using the visual information provided by the camera sensors 710. In another embodiment, the video-enhanced traffic/link quality predictor 730 pairs UEs with APs based on the visual information provided by the camera sensors 710.

Figure 8:
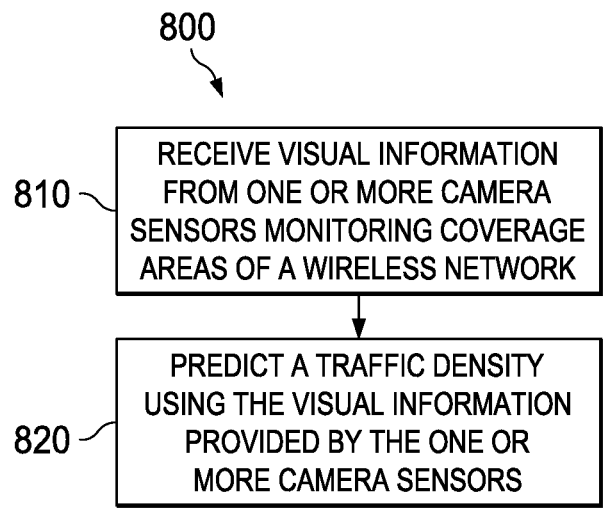
FIG. 8 illustrates a flowchart of an embodiment method for predicting traffic density using visual information provided by camera sensors monitoring a wireless network.

FIG. 8 illustrates a flowchart of an embodiment method 800 for using visual information to predict traffic density in a wireless network, as might be performed by a network device, e.g., an AP, a controller, a video-enhanced traffic/link quality predictor. At step 810, the network device receives visual information from one or more camera sensors monitoring coverage areas of a wireless network. At step 820, the network device predicts a traffic density using the visual information provided by the camera sensors.

Figure 9:
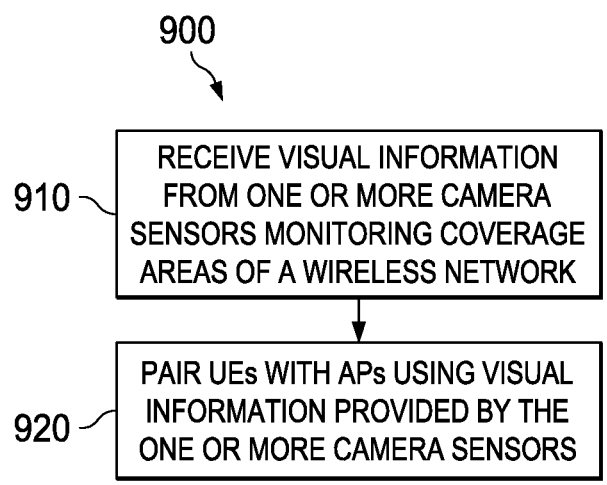
FIG. 9 illustrates a flowchart of an embodiment method for using visual information to pair UEs to APs in a wireless network.

FIG. 9 illustrates a flowchart of an embodiment method 900 for using visual information to pair UEs to APs in a wireless network, as might be performed by a network device, e.g., an AP, a controller, a video-enhanced traffic/link quality predictor. At step 910, the network device receives visual information from one or more camera sensors monitoring coverage areas of a wireless network. At step 920, the network device pairs UEs with APs using the visual information provided by the camera sensors.

Figure 10:
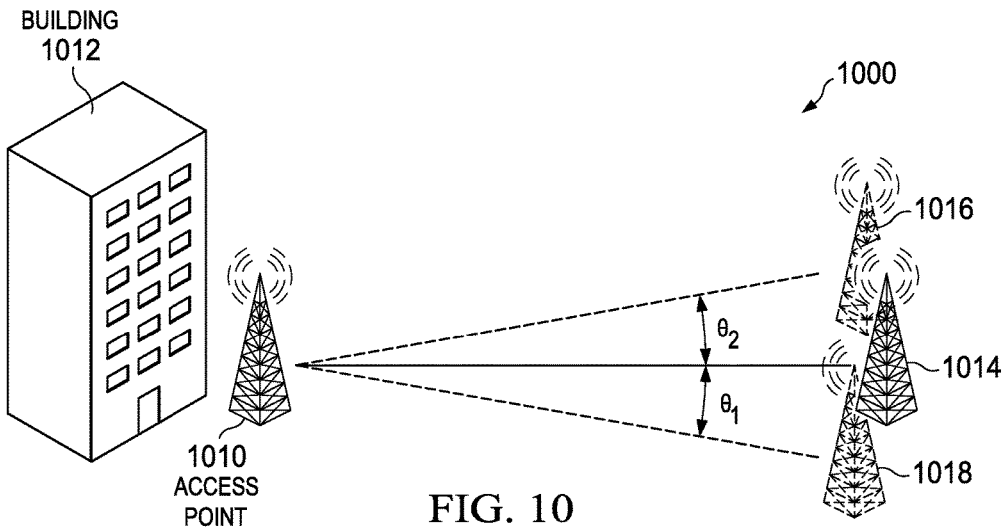
FIG. 10 illustrates a diagram of an embodiment wireless network in which visual information is used to assign transmission parameters over a microwave backhaul interface.

In a further embodiment, which will be explained below with reference to FIG. 10, an image processing system provides an input to a control system for a fixed point-to-point link, such as a microwave backhaul link. In areas in which providing a wired backhaul link to an AP is not feasible, it may be preferable to make use of a high capacity radio link, such as a microwave link. In such an embodiment, the AP is one endpoint of a microwave link, with the other endpoint being a microwave transceiver. If one, or both, of the AP and the microwave transceiver are mounted to a conventional transmission tower, high winds can cause the relative position of the two endpoints to vary. To a ground-based observer, this is manifested as a tower subtly swaying. Even securing the tower with guidelines cannot guarantee a perfectly stable tower.

The two endpoints are typically within line of sight of each other to ensure a clear channel. RF beam steering allows transmitters to adjust the transmission angle of a signal without requiring mechanical steering systems. RF beam steering allows for faster signal steering but it is typically restricted to a narrow angular range in comparison to a mechanical steering system that re-orients the transmitter to aim a beam.

By capturing a stream of images, each end of the microwave link can provide an input to its own beam steering control system to allow each end to assist the beam steering system to properly aim the signal to where the receiver is/will be instead of sending the signal to where the receiver was previously. This can be understood with reference to FIG. 10. FIG. 10 illustrates a top view of a system 1000 having an AP 1010 that is securely mounted to a building 1012. This allows the AP to be effectively fixed in position under all but the most extreme situations. The AP 1010 receives its backhaul connection through a microwave link to a tower mounted transceiver at position 1014. The transceiver may be an active antenna adapted for both cellular and microwave transmission and reception, and may provide wireless access to mobile devices in a coverage area of the AP 1110. Other configurations are also possible. Both ends of the microwave connection can be configured to steer their transmitted signal. Under windy conditions, the cellular tower may sway, causing the position of the transceiver can be offset to other positions. In the example illustrated in FIG. 10, the transceiver is offset to positions 1016 and 1018. AP 1010 can see the deviation from $\theta_1$ to $\theta_2$. Assuming that the camera is oriented along the normal transmission path, deviation angles can be calculated (based on the observed offset of the transceiver and the known distance between the transceiver and the AP). These deviation angles can be provided as an input to a beam steering control system at the AP.

One skilled in the art will appreciate that even if the AP is fixed, from the perspective of a camera attached to the transceiver, movement to positions 1016 and 1018 will result in the transceiver camera "seeing" movement in the AP 1010. This allows for the determination of a deviation angle that can be provided to the beam steering control system in the transceiver.

In a further refinement, it will be noted that the change in position from 1014 to 1016 and 1018 includes more than just an offset that is perpendicular to the line of transmission when the transceiver is at position 1014. Image processing at AP 1010 can determine a relative change in size of the transceiver and use the change in size to help determine a change in the length of the RF channel. This can be used as an input to beam steering, but could also be used to change other transmission parameters associated with the channel.

Visual information may have other uses in wireless networks beyond those mentioned explicitly above. For example, visual information may be used to detect faulty equipment, and/or aid in network troubleshooting. Visual information may also be used to predict channel parameters between a transmit point and a receive point, which could then be used to assign a scheduling or transmission parameter. For instance, the visual information could be used to predict a device orientation or mechanical beamsteering orientation of a transmit point and/or a receive point.

Figure 11:
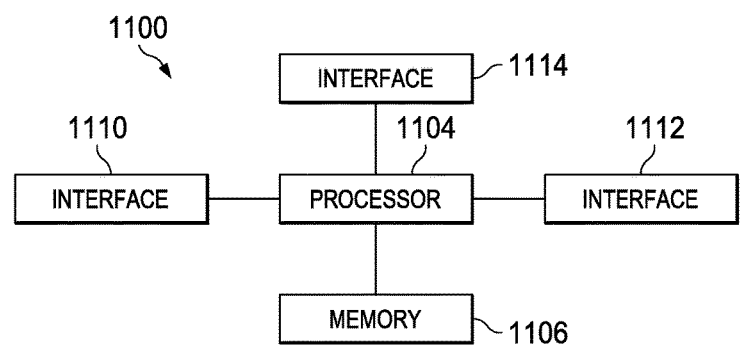
FIG. 11 illustrates a block diagram of an embodiment processing system.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
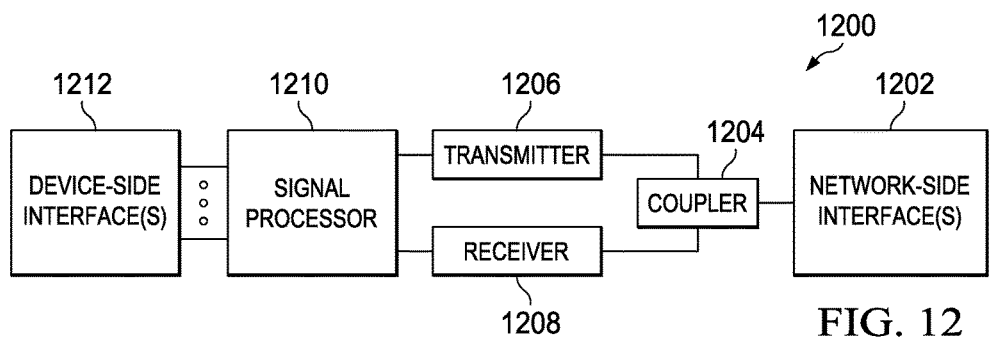
FIG. 12 illustrates a block diagram of an embodiment transceiver.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for camera aided wireless network management, the method comprising:
   receiving visual information from one or more camera sensors monitoring coverage areas of a wireless network;
   predicting a direction of departure (DoD) or an angle of departure (AoD) between a receive point and a transmit point in accordance with the visual information provided by the one or more camera sensors; and
   assigning a scheduling or transmission parameter for a wireless signal transmitted from the transmit point to the receive point in accordance with the predicted DoD or the predicted AoD.

2. The method of claim 1, further comprising:
   visually discovering a user equipment (UE) in a coverage area of an access point (AP) in accordance with the visual information provided by the one or more camera sensors, the receive point and the transmit point corresponding to the UE and the AP, or vice versa; and
   initiating link discovery between the AP and the UE when the visual information provided by the one or more camera sensors satisfy a link discovery criterion.

3. The method of claim 2, wherein the link discovery criterion is satisfied when the visual information provided by the one or more camera sensors indicates an unobstructed line-of-sight between the AP and the UE.

4. The method of claim 2, wherein the link discovery criterion is satisfied when a predicted link quality between the AP and the UE, as estimated from the visual information, exceeds a threshold.

5. The method of claim 4, wherein the predicted link quality corresponds to an indirect link between the AP and the UE.

6. The method of claim 2, wherein visually discovering the UE in the coverage area of the AP comprises:
   identifying a light emitting diode (LED) signature emitted by the UE.

7. The method of claim 6, wherein the LED signature is emitted at a frequency that is outside the visible spectrum observed by humans.

8. The method of claim 7, wherein the frequency of the LED signature is between 430 terahertz (THz) and 790 terahertz (THz).

9. The method of claim 2, wherein assigning the scheduling or transmission parameter for the wireless signal transmitted from the transmit point to the receive point in accordance with the predicted DoD or the predicted AoD comprises:
   assigning a precoder to a discovery signal transmission of the UE or the AP in accordance with the predicted DoD or the predicted AoD.

10. A method for camera aided wireless network management, the method comprising:
    receiving visual information from one or more camera sensors monitoring coverage areas of a wireless network; and
    assigning a scheduling or transmission parameter for a transmission between a transmit point and a receive point in accordance with the visual information provided by the one or more camera sensors,
    wherein assigning the scheduling or transmission parameter for the transmission between the transmit point and the receive point in accordance with the visual information provided by the one or more camera sensors comprises predicting a link obstruction over a radio interface between the transmit point and the receive point in accordance with the visual information provided by the one or more camera sensors, and modifying the scheduling or transmission parameter of the radio interface for a time period, during which the link obstruction is predicted to occur, to mitigate or avoid a reduction in link quality resulting from the link obstruction.

11. The method of claim 10, wherein modifying the scheduling or transmission parameter of the radio interface for the time period to mitigate or avoid a reduction in link quality resulting from the link obstruction comprises:
increasing a transmit power level or lowering a modulation and coding scheme (MCS) level of a transmission communicated over the radio interface during the time period to compensate for increased path loss resulting from the link obstruction.

12. The method of claim 10, wherein modifying the scheduling or transmission parameter of the radio interface for the time period to mitigate or avoid a reduction in link quality resulting from the link obstruction comprises:
modifying an antenna transmission scheme of a transmission communicated over the radio interface during the time period.

13. The method of claim 12, wherein modifying the antenna transmission scheme of the transmission communicated over the radio interface for the time period comprises:
assigning a new precoder to the transmit point during the time period to modify a signal path of the radio interface during the time period.

14. The method of claim 10, wherein the transmit point comprises a serving access point (AP) and the receive point comprises a served user equipment (UE), or vice versa, and wherein modifying the scheduling or transmission parameter for the time period comprises:
initiating a handover from the serving AP to a neighboring AP prior to the time period.

15. The method of claim 10, wherein the transmit point comprises a serving access point (AP) and the receive point comprises a served user equipment (UE), or vice versa, and wherein modifying the scheduling or transmission parameter during the time period comprises:
scheduling a joint transmission or a joint reception between the serving AP and a neighboring AP for data communicated by the UE during the time period.

16. The method of claim 10, wherein predicting the link obstruction over the radio interface between the transmit point and the receive point in accordance with the visual information provided by the one or more camera sensors comprises:
tracking a position of a moving object; and
predicting that the moving object will pass through a signal path between the transmit point and the receive point.

17. The method of claim 16, wherein the signal path comprises a line of sight between the transmit point and the receive point.

18. The method of claim 16, wherein the signal path comprises an indirect signal path reflecting off a reflection point between the transmit point and the receive point.

19. The method of claim 10, wherein the transmit point comprises a serving access point (AP) and the receive point comprises a served user equipment (UE), or vice versa, and wherein predicting the link obstruction over the radio interface between the transmit point and the receive point in accordance with the visual information provided by the one or more camera sensors comprises:
tracking a position of the served UE as the served UE migrates throughout a coverage area of the serving AP; and
predicting that the served UE will migrate to a position such that an object will pass through a signal path between the served UE and the serving AP.

20. The method of claim 19, wherein the object is a stationary structure.

21. The method of claim 10, wherein predicting the link obstruction over the radio interface between the transmit point and the receive point in accordance with the visual information provided by the one or more camera sensors comprises:
identifying a weather condition; and
predicting that the weather condition will increase a path loss over the radio interface.

22. The method of claim 21, wherein the weather condition comprises precipitation.

23. The method of claim 21, wherein modifying the scheduling or transmission parameter for the time period to mitigate or avoid the reduction in link quality comprises:
changing from a multi-polarization transmission scheme to a single-polarization transmission scheme.

24. A method for camera aided wireless network management, the method comprising:
receiving visual information from one or more camera sensors monitoring coverage areas of a wireless network; and
assigning a scheduling or transmission parameter for a transmission between a transmit point and a receive point in accordance with the visual information provided by the one or more camera sensors, wherein assigning the scheduling or transmission parameter for the transmission between the transmit point and the receive point in accordance with the visual information provided by the one or more camera sensors comprises predicting a mechanical beamsteering orientation of the transmit point or the receive point, and assigning the scheduling or transmission parameter in accordance with the predicted mechanical beamsteering orientation.

25. A network device comprising:
a processor; and
a computer readable storage medium storing programming for execution by the processor, the programming including instructions to:
receive visual information from one or more camera sensors monitoring coverage areas of a wireless network;
predict a direction of departure (DoD) or an angle of departure (AoD) between a receive point and a transmit point in accordance with the visual information provided by the one or more camera sensors; and
assign a scheduling or transmission parameter for a wireless signal transmitted from the transmit point to the receive point in accordance with the predicted DoD or the predicted AoD.

26. A method for camera aided wireless network management, the method comprising:
receiving visual information from one or more camera sensors monitoring coverage areas of a wireless network; and
predicting traffic density using the visual information provided by the one or more camera sensors, wherein predicting traffic density using the visual information provided by the one or more camera sensors comprises predicting an increased traffic density in a first coverage area upon determining that a plurality of UEs are migrating towards the first coverage area based on the visual information provided by the one or more camera sensors.

27. A network device comprising:
a processor; and a computer readable storage medium storing programming for execution by the processor, the programming including instructions to:
- receive visual information from one or more camera sensors monitoring coverage areas of a wireless network; and
- predict traffic density using the visual information provided by the one or more camera sensors, wherein the instructions to predict traffic density using the visual information provided by the one or more camera sensors include instructions to predict an increased traffic density in a first coverage area upon determining that a plurality of UEs are migrating towards the first coverage area based on the visual information provided by the one or more camera sensors.

28. A method for camera aided management of backhaul links, the method comprising:
- receiving visual information from one or more camera sensors monitoring a microwave backhaul link between a first network-side component and a second network-side component;
- identifying a movement of the second network-side component using the visual information, wherein locations of the one or more camera sensors do not change when the second network-side component moves; and
- modifying a transmission angle of a signal communicated over the microwave backhaul link to compensate for the movement of the second network-side component.

29. The method of claim 28, wherein the first network-side component is an access point and the second network-side component is a transceiver mounted to a cell tower, and wherein the movement of the second network-side component corresponds to a swaying of the cell tower.

30. The method of claim 28, wherein modifying a transmission angle of the signal communicated over the microwave backhaul link comprises performing electronic or mechanical beamsteering on a microwave transceiver of the first network-side component or the second network-side component.

31. The method of claim 28, wherein the one or more camera sensors are not co-located with either of the first network-side component or the second network-side component.

* * * * *